(12) United States Patent
Imai et al.

(10) Patent No.: US 7,746,457 B2
(45) Date of Patent: Jun. 29, 2010

(54) LIGHT QUANTITY MEASURING APPARATUS

(75) Inventors: Kiyoshi Imai, Toyohashi (JP); Makoto Takahashi, Toyohashi (JP); Shinji Shimizu, Sakai (JP)

(73) Assignee: Konica Minolta Sensing, Inc., Osaka (JP)

( * ) Notice: Subject to any disclaimer, the term of this patent is extended or adjusted under 35 U.S.C. 154(b) by 0 days.

(21) Appl. No.: 12/290,867

(22) Filed: Nov. 4, 2008

(65) Prior Publication Data

US 2009/0116002 A1 May 7, 2009

(30) Foreign Application Priority Data

Nov. 7, 2007 (JP) .............................. 2007-289255

(51) Int. Cl.
  G01J 1/42 (2006.01)
  G01R 13/20 (2006.01)
  H04N 7/08 (2006.01)
(52) U.S. Cl. .................. 356/218; 348/476; 348/188; 348/208.6; 324/121 R
(58) Field of Classification Search ......... 356/213–230, 356/43–44; 250/205, 238, 214 C, 241 R; 348/183, 188–191, 476, 208.6; 324/121 R, 324/158.1
See application file for complete search history.

(56) References Cited

U.S. PATENT DOCUMENTS

| | | | | |
|---|---|---|---|---|
| 5,049,791 A | * | 9/1991 | Kawakami | ............. 315/368.11 |
| 5,327,210 A | * | 7/1994 | Okui et al. | ................... 356/218 |
| 5,440,340 A | * | 8/1995 | Tsurutani et al. | ............ 348/190 |
| 5,521,486 A | * | 5/1996 | Takamoto et al. | ............. 322/99 |
| 5,835,135 A | * | 11/1998 | Hamaguri et al. | ........... 348/191 |
| 6,011,901 A | * | 1/2000 | Kirsten | ........................ 386/123 |
| 6,014,168 A | * | 1/2000 | Webb et al. | .................. 348/190 |
| 6,333,627 B1 | * | 12/2001 | Nishikawa | .............. 324/121 R |
| 6,348,944 B1 | * | 2/2002 | Kimoto et al. | .............. 348/173 |
| 6,437,829 B1 | * | 8/2002 | Webb et al. | .................. 348/476 |
| 6,462,777 B1 | * | 10/2002 | Hamaguri | .................... 348/188 |
| 7,593,038 B2 | * | 9/2009 | Ochiai | ..................... 348/208.6 |

FOREIGN PATENT DOCUMENTS

JP 2003-018458 1/2003

* cited by examiner

*Primary Examiner*—Sang Nguyen
(74) *Attorney, Agent, or Firm*—Brinks Hofer Gilson & Lione (57) ABSTRACT

The present invention provides a light quantity measuring apparatus capable of properly measuring, in short time, light to be measured whose quantity fluctuates periodically. Charges generated and stored in photodiodes during a measurement period are read in a plurality of times. A control unit obtains pixel data according to quantity of the charges generated and stored by the photodiodes in a plurality of storage periods obtained by dividing a measurement period. Further, the control unit adds up the plurality of pieces of pixel data, and calculates pixel data according to the quantities of charges generated and stored by the photodiodes in the measurement period.

9 Claims, 8 Drawing Sheets

| | | FREQUENCY(Hz) | | | | | | | | | | | |
|---|---|---|---|---|---|---|---|---|---|---|---|---|---|
| | | 20 | 55 | 56 | 57 | 58 | 59 | 60 | 61 | 62 | 63 | 64 | 65 | 200 |
| CONVENTIONAL TECHNIQUE | MAXIMUM VALUE | 7.126 | 5.037 | 4.951 | 4.864 | 4.782 | 4.701 | 4.630 | 5.219 | 5.500 | 6.020 | 6.232 | 6.224 | 4.865 |
| | MINIMUM VALUE | 0.067 | 3.041 | 2.760 | 3.528 | 4.107 | 4.166 | 4.621 | 4.540 | 4.470 | 4.398 | 4.330 | 4.265 | 4.229 |
| | AVERAGE VALUE | 5.042 | 4.607 | 4.627 | 4.697 | 4.701 | 4.658 | 4.624 | 4.610 | 4.562 | 4.558 | 4.691 | 4.677 | 4.631 |
| | ERROR RANGE OF READING | 140% | 43% | 47% | 28% | 14% | 11% | 0.2% | 14.7% | 22.6% | 35.6% | 40.6% | 41.9% | 14% |
| PRESENT INVENTION | MAXIMUM VALUE | 4.685 | 4.652 | 4.654 | 4.655 | 4.655 | 4.655 | 4.660 | 4.652 | 4.652 | 4.653 | 4.652 | 4.653 | 4.664 |
| | MINIMUM VALUE | 1.515 | 4.638 | 4.635 | 4.639 | 4.651 | 4.652 | 4.652 | 4.650 | 4.649 | 4.649 | 4.651 | 4.651 | 4.662 |
| | AVERAGE VALUE | 2.704 | 4.650 | 4.649 | 4.651 | 4.653 | 4.653 | 4.653 | 4.651 | 4.651 | 4.651 | 4.652 | 4.652 | 4.663 |
| | ERROR RANGE OF READING | 117% | 0.3% | 0.4% | 0.4% | 0.1% | 0.1% | 0.2% | 0.1% | 0.1% | 0.1% | 0.0% | 0.0% | 0.0% |

FIG. 8

LIGHT QUANTITY MEASURING APPARATUS

This application is based on application No. 2007-289255 filed in Japan, the contents of which are hereby incorporated by reference.

BACKGROUND OF THE INVENTION

1. Field of the Invention

The present invention relates to a light quantity measuring apparatus capable of properly measuring quantity of light to be measured, which fluctuates periodically.

2. Description of the Background Art

A light quantity measuring apparatus for measuring quantity of light to be measured has generally a sensor for outputting a signal according to the quantity of received light to be measured, and specifies the quantity of measured light from the output of the sensor. However, when such a light quantity measuring apparatus measures light whose quantity periodically fluctuates like light generated by a display, a measurement result fluctuates according to timings of measurement, and a problem occurs such that a stable measurement result cannot be obtained.

To solve such a problem, as described in "VESA Flat Panel Display Standard", (U.S.A.), p. 172, an output of a sensor is filtered by a low-pass filter having a time constant sufficiently longer than the period of fluctuations in the quantity of light to be measured, thereby preventing the measurement result from being influenced by the periodical fluctuations in the quantity of light to be measured.

By storing charges generated by a sensor for time sufficiently longer than the fluctuation period of the quantity of light to be measured, the measurement result is prevented from being influenced by periodic fluctuations in the quantity of the light to be measured.

Further, as shown in Japanese Patent Application Laid-Open No. 2003-18458, by storing charges generated by a sensor for time which is an integral multiple of the fluctuation cycle of the quantity of light to be measured, the measurement result is prevented from being influenced by periodic fluctuations in the quantity of the light to be measured.

In addition, by repeating measurement of the quantity of light to be measured and obtaining average of measurement results, the measurement result is prevented from being influenced by the periodic fluctuations in the quantity of light to be measured.

In the method of filtering an output of a sensor by a low-pass filter, however, in a case where it is necessary to measure light having different light quantity fluctuation cycles, a plurality of low-pass filters of different time constants have to be prepared and a low-pass filter to be used has to be selected according to the fluctuation cycle of the quantity of light to be measured. Selection of a low-pass filter is complicated and in a case where the fluctuation cycle of the quantity of light to be measured is unstable or in a case where the fluctuation cycle of the quantity of light to be measured is unknown, it is difficult to select a low-pass filter. For such a reason, an output of the sensor is filtered by a low-pass filter having a very long time constant, and time required for measurement is very long.

In the method of storing charges generated by the sensor for time which is sufficiently longer than the fluctuation cycle of the quantity of light to be measured, the time required for measurement is very long. Moreover, in a case of using a high-sensitivity sensor which is becoming common in recent years, saturation of charges occurs during storage of the charges, and proper measurement cannot be performed.

Further, in the method of storing charges generated by the sensor for time which is an integral multiple of the fluctuation cycle of the quantity of light to be measured, in the case where the fluctuation cycle of the quantity of light to be measured is unstable or in the case where the fluctuation cycle of the quantity of light to be measured is unknown, storage of charges cannot be synchronized with the period fluctuations of the quantity of light to be measured, and proper measurement cannot be performed. In the case of using a high-sensitivity sensor which is becoming common in recent years, saturation of charges occurs during storage of the charges, and proper measurement cannot be performed.

In addition, in the method of repeating measurement of the quantity of light to be measured and calculating average of measurement results, measurement is performed a number of times so that a measurement result is not influenced by fluctuations in the quantity of light to be measured between measurements, so that time required for measurement is very long. When an attempt is made to measure the quantity of light whose light emission period is equal to or less than a few percentages of the light emission cycle like light generated by a CRT (Cathode Ray Tube) display or a plasma display, the interval between the measurements become the light emission period, and a large error may occur in the measurement result. There is possibility that such a large error occurs also in a case of measuring the quantity of light generated by a liquid crystal display employing a drive method called black insertion.

The problem of saturation of charges can be solved by reducing light to be measured which reaches the sensor by a neutral density filter. However, when the transmittance of the neutral density filter decreases, it becomes difficult to assure precision of the transmittance and, depending on the quantity of light to be measured, when the neutral density filter is used, repetitiveness cannot be assured. A problem occurs such that, if a neutral density filter is not used, time required for measurement becomes very long.

SUMMARY OF THE INVENTION

The present invention relates to a light quantity measuring apparatus for measuring quantity of light to be measured.

According to a first aspect of the present invention, a light quantity measuring apparatus for measuring quantity of light to be measured includes: a charge generator for generating charges according to quantity of received light to be measured; a storage for storing the charges generated by the charge generator; an A/D converter for converting quantity of the charges stored in the storage to a digital value; an integrator for adding up a plurality of digital values; and a controller for controlling the light quantity measuring apparatus, wherein, under control of the controller, the charge generator continuously generates charges according to the quantity of the received light to be measured during a measurement period, the storage stores the charges generated by the charge generator in each of a plurality of storage periods obtained by dividing the measurement period, the A/D converter converts the quantity of charges stored in the storage in each of the plurality of storage periods to a digital value, and the integrator adds up a plurality of digital values obtained by conversion of the A/D converter.

According to the present invention, light to be measured whose quantity periodically fluctuates can be properly measured in short time without causing saturation in the storage.

An object of the present invention is therefore to provide a light quantity measuring apparatus capable of properly measuring, in short time, light to be measured whose quantity periodically fluctuates.

These and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment 1-1 Configuration of Spectral Radiance Meter 1

Figure 1:
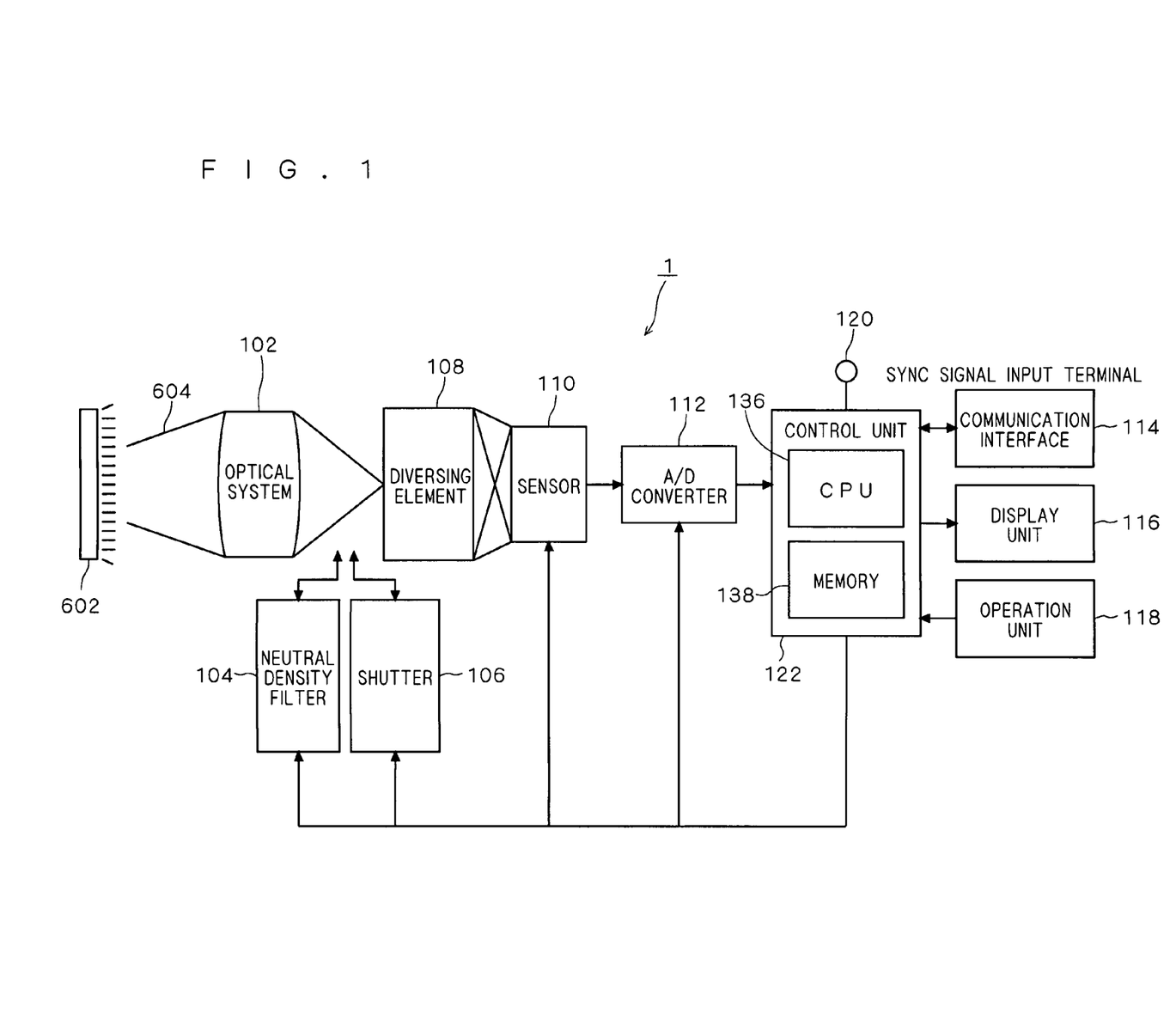
FIG. 1 is a schematic diagram of a spectral radiance meter as a first embodiment.

FIG. 1 is a schematic diagram of a spectral radiance meter 1 as a first embodiment of the present invention. The spectral radiance meter 1 mainly measures spectral radiance of light, light 604 to be measured, generated by a display 602 such as a CRT display, a plasma display, or a liquid crystal display.

As shown in FIG. 1, the spectral radiance meter 1 has an optical system 102, a neutral density filter 104, a shutter 106, a diversing element 108, a sensor 110, an A/D converter 112, a communication interface 114, a display unit 116, an operation-unit 118, a sync signal input terminal 120, and a control unit 122.

The optical system 102 guides the light 604 to be measured which is incident on the spectral radiance meter 1 to the sensor 110 via the diversing element 108, and an optical image is formed on a photosensitive surface of the sensor 110. The optical system 102 can be constructed by combining a lens and a mirror.

The neutral density filter 104 reduces transmission light. The neutral density filter 104 is inserted or removed to/from the optical path of the light 604 to be measured under control of the control unit 122. In a case where the neutral density filter 104 is inserted in the optical path of the light 604 to be measured, light incident on the spectral radiance meter 1 is reduced by the neutral density filter 104 and the resultant light reaches the sensor 110. On the other hand, in a case where the neutral density filter 104 is removed from the optical path of the light 604 to be measured, the light incident on the spectral radiance meter 1 reaches the sensor 110 without being reduced. Therefore, the neutral density filter 104 functions as adjusting means for adjusting the quantity of the light 604 to be measured which reaches the sensor 110 under control of the control unit 122. The transmittance of the neutral density filter 104 is set to, preferably, 2% or higher, more preferably, 5% or higher. When the transmittance lies in the range, the neutral density filter 104 with transmittance precision being excellent can be used.

The shutter 106 interrupts light. The shutter 106 is inserted or removed to/from the optical path of the light 604 to be measured under control of the control unit 122. In a case where the shutter 106 is inserted in the optical path of the light 604 to be measured, the light 604 to be measured which is incident on the spectral radiance meter 1 does not reach the sensor 110. On the other hand, in a case where the shutter 106 is removed from the optical path of the light 604 to be measured, the light 604 to be measured which is incident on the spectral radiance meter 1 reaches the sensor 110.

The diversing element 108 disperses the incident light 604 to be measured according to its wavelength. For example, it is possible to use a diffraction grating or prism as the diversing element 108. Especially, It is desirable to use a concave diffraction grating as the diversing element 108. When a concave diffraction grating is used as the diversing element 108, the optical system 102 can be simplified.

The sensor 110 receives the light 604 to be measured which is dispersed by the diversing element 108 according to its wavelength, and outputs a signal indicative of the light quantity of the light 604 to be measured of each wavelength component.

Figure 2:
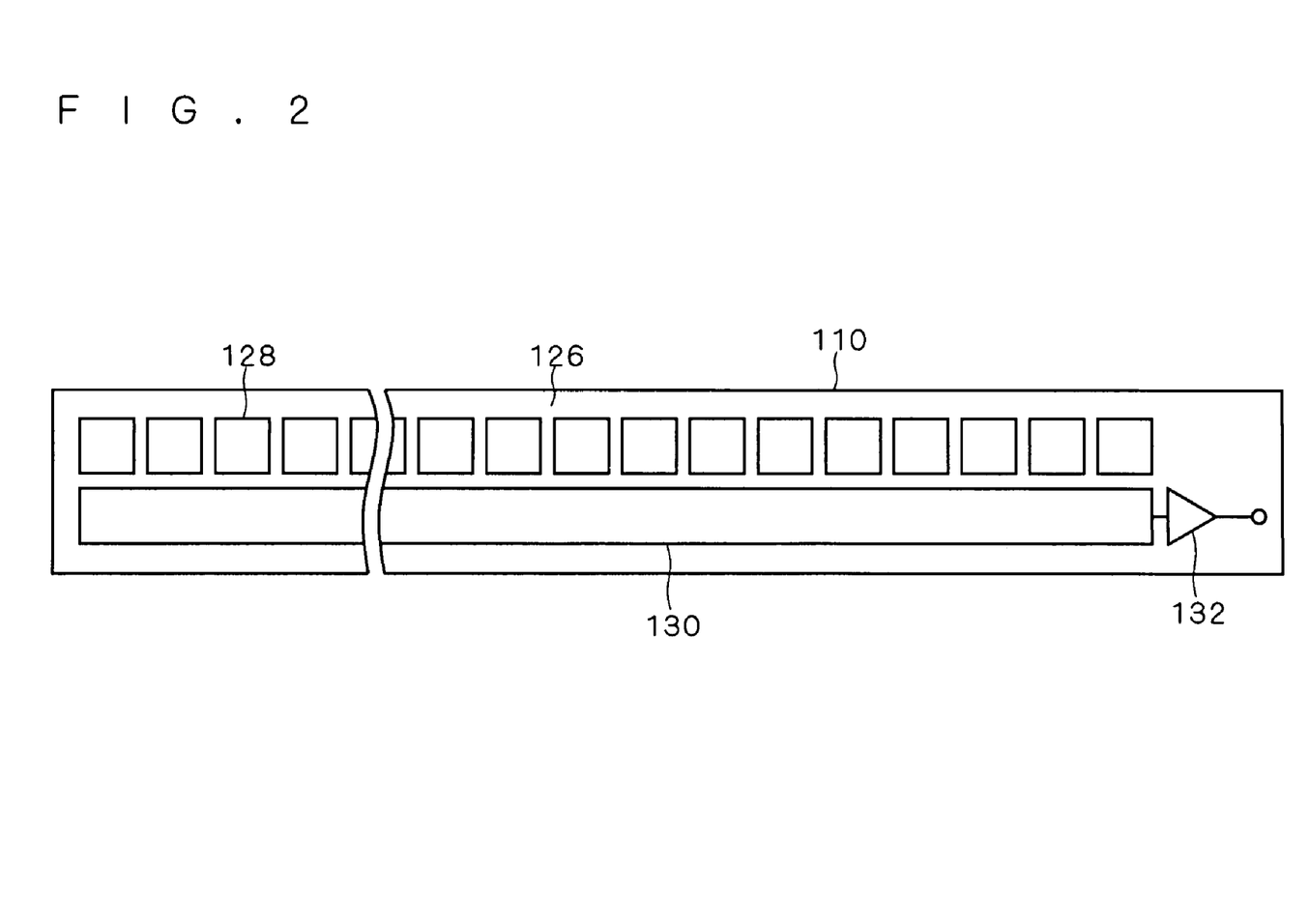
FIG. 2 is a plan view of a sensor.

FIG. 2 is a schematic diagram of the sensor 110. FIG. 2 is a plan view of the sensor 110. As shown in FIG. 2, a plurality of photodiodes 128 are arranged in a photosensitive surface 126 of the sensor 110. The arrangement direction of the photodiodes 128 coincides with a dispersing direction of the light 604 to be measured of the diversing element 108 according to its wavelength. Therefore, each of the photodiodes 128 photoelectric-converts a specific wavelength component in the received light 604 to be measured, generates charges according to the light quantity of the specific wavelength component in the received light 604 to be measured, and stores the generated charges. It is unnecessary to perform both of generation and storage of charges by the photodiodes 128. Charges generated by the photodiodes 128 may be stored in a charge storage provided independently of the photodiodes 128.

The sensor 110 has a CCD (Charge Coupled Device) 130 and an FD (Floating Diffusion) amplifier 132. The CCD 130 transfers the charges generated and stored by the photodiodes 128 to the FD amplifier 132. The FD amplifier 132 outputs an analog pixel signal having a voltage according to the amount of charges transferred by the CCD 130. In place of the FD amplifier 132, an FG (Floating Gate) amplifier can be also used.

Referring again to FIG. 1, the A/D converter 112 converts the analog pixel signal output from the sensor 110 to digital pixel data and outputs the digital pixel data to the control unit 122. Consequently, the A/D converter 112 can convert the amount of charges stored in the photodiodes 128 to a digital value and output the digital value.

The communication interface 114 connects the spectral radiance meter 1 and an external device such as an external computer so that they can communicate with each other.

The display unit 116 displays a measurement result of the spectral radiance meter 1. In place of or in addition to the display of the measurement result of the display unit 116, the measurement result may be output to the external device connected to the spectral radiance meter 1 via the communication interface 114.

The operation unit 118 accepts an operation of the operator such as input of the fluctuation cycle of the quantity of light to be measured and length of a measurement period (hereinbelow, called "measurement time"). In place of or in addition to the acception of the operation of the operator by the operation unit 118, the operation unit 118 may accept a remote operation from the external device connected to the spectral radiance meter 1 via the communication interface 114.

The sync signal input terminal 120 obtains a signal which fluctuates synchronously with fluctuations in the quantity of the light 604 to be measured like a vertical sync signal in a case of measuring light generated by a CRT display.

The control unit 122 is a built-in computer having at least a CPU 136 and a memory 138 and makes the CPU 136 execute a control program loaded to the memory 138, thereby controlling the neutral density filter 104, the shutter 106, the sensor 110, the A/D converter 112, the communication interface 114, the display unit 116, the operation unit 118, and the other parts of the spectral radiance meter 1. The control unit 122 makes the CPU 136 execute the control program loaded to the memory 138, thereby computing spectral radiance from collection of pixel data obtained from the A/D converter 112.

During the measurement period in which the photodiodes 128 photoelectrically convert the light 604 to be measured, the control unit 122 makes the CCD 130 transfer the charges generated and stored by the photodiodes 128 from the photodiodes 128 to the FD amplifier 132, makes the FD amplifier 132 output an analog pixel signal having a voltage according to the quantity of charges transferred by the CCD 130, and makes the A/D converter 112 convert the analog pixel signal output from the sensor 110 to digital pixel data.

Figure 3:
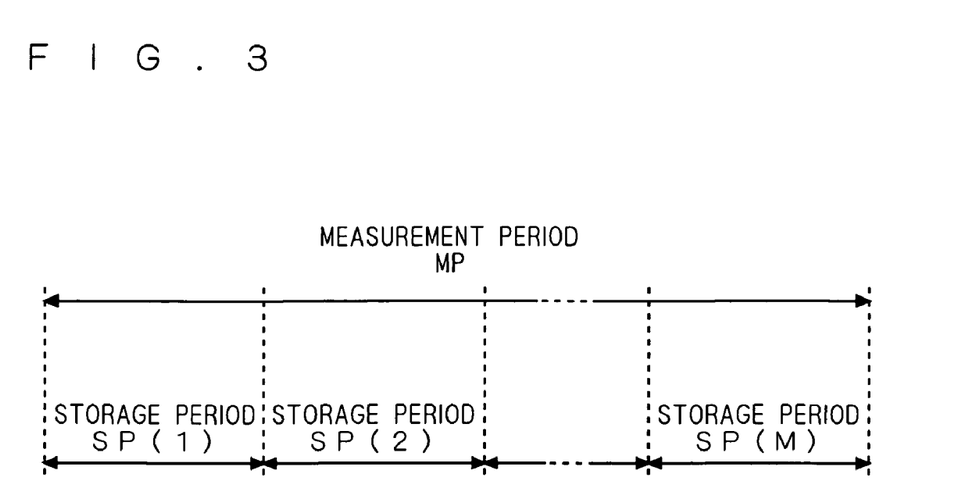
FIG. 3 is a diagram showing the relation between a measurement period and a storage period.

By the operations, the charges generated and stored in the photodiodes 128 during the measurement period are read in a plurality of times. The control unit 122 obtains pixel data D(1, i), D(2, i), . . . , and D(M, i) according to quantity Q(1, i), Q(2, i), . . . , and Q(m, i) (where i=1, 2, . . . , N) of charges generated and stored by the photodiodes 128 in a plurality of storage periods SP(1), SP(2), . . . , SP(M) obtained by dividing a measurement period MP as shown in FIG. 3. The pixel data D(j, i) is obtained by converting a pixel signal A(j, i) having a voltage according to the quantity Q(j, i) of charges generated and stored by the i-th photodiode 128 in the storage period SP(j) (j=1, 2, . . . , M) to a digital value.

Further, the control unit 122 adds up the plurality of pieces of pixel data D(1, i), D(2, i), . . . , and D(M, i) in accordance with Equation 1, and calculates pixel data D(1), D(2), . . . , and D(N) according to the quantities Q(1), Q(2), . . . , and Q(N) generated and stored by the photodiodes 128 in the measurement period MP.

$$D(i) = \sum_{j=1}^{M} D(j, i) \ (i = 1, 2, \ldots, N) \quad \text{Equation (1)}$$

The control unit 122 computes spectral radiance from the pixel data D(1), D(2), . . . , and D(N).

1-2 Operation of Spectral Radiance Meter 1

Figure 4:
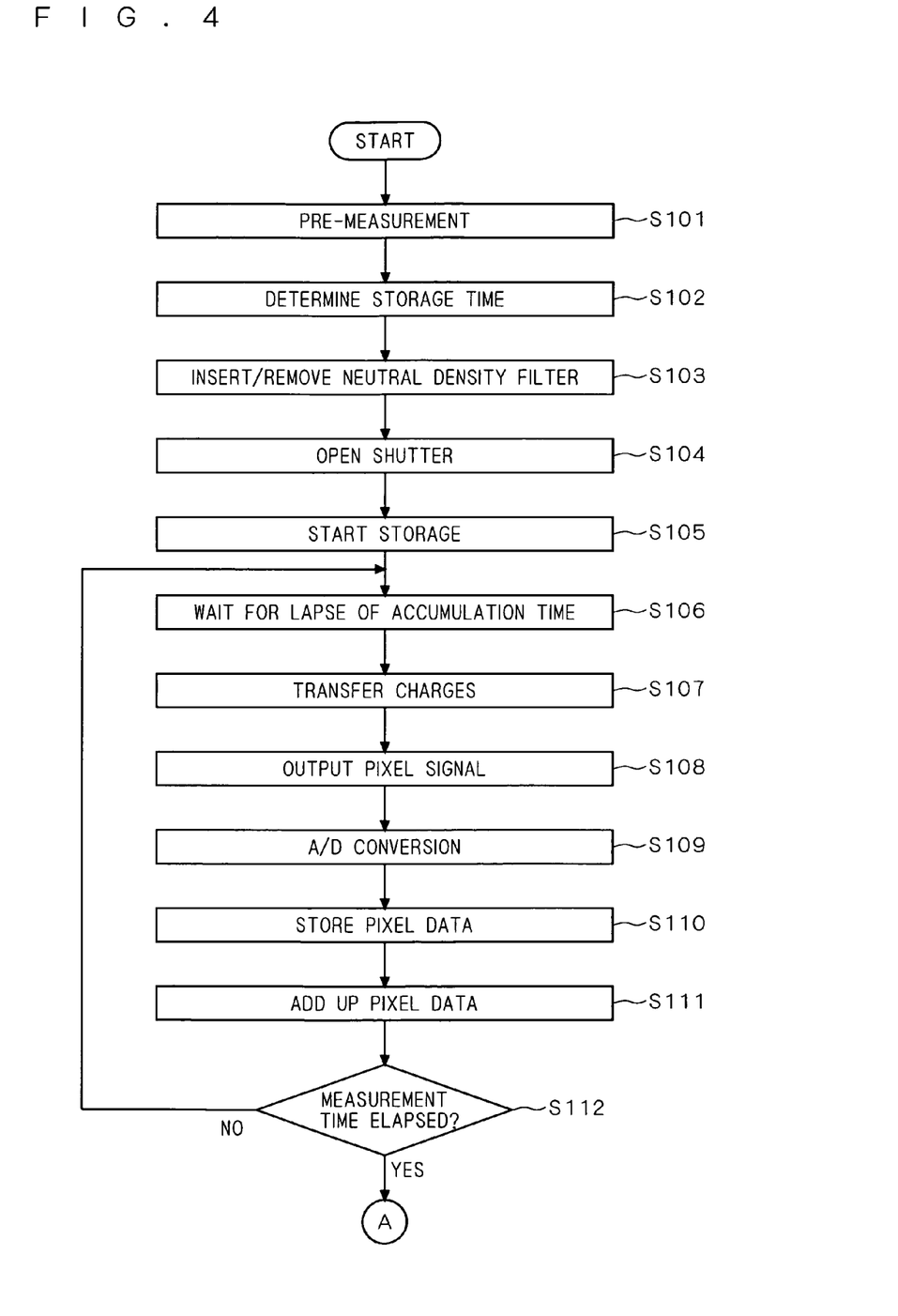
FIG. 4 is a flowchart showing operations of the spectral radiance meter.
Figure 5:
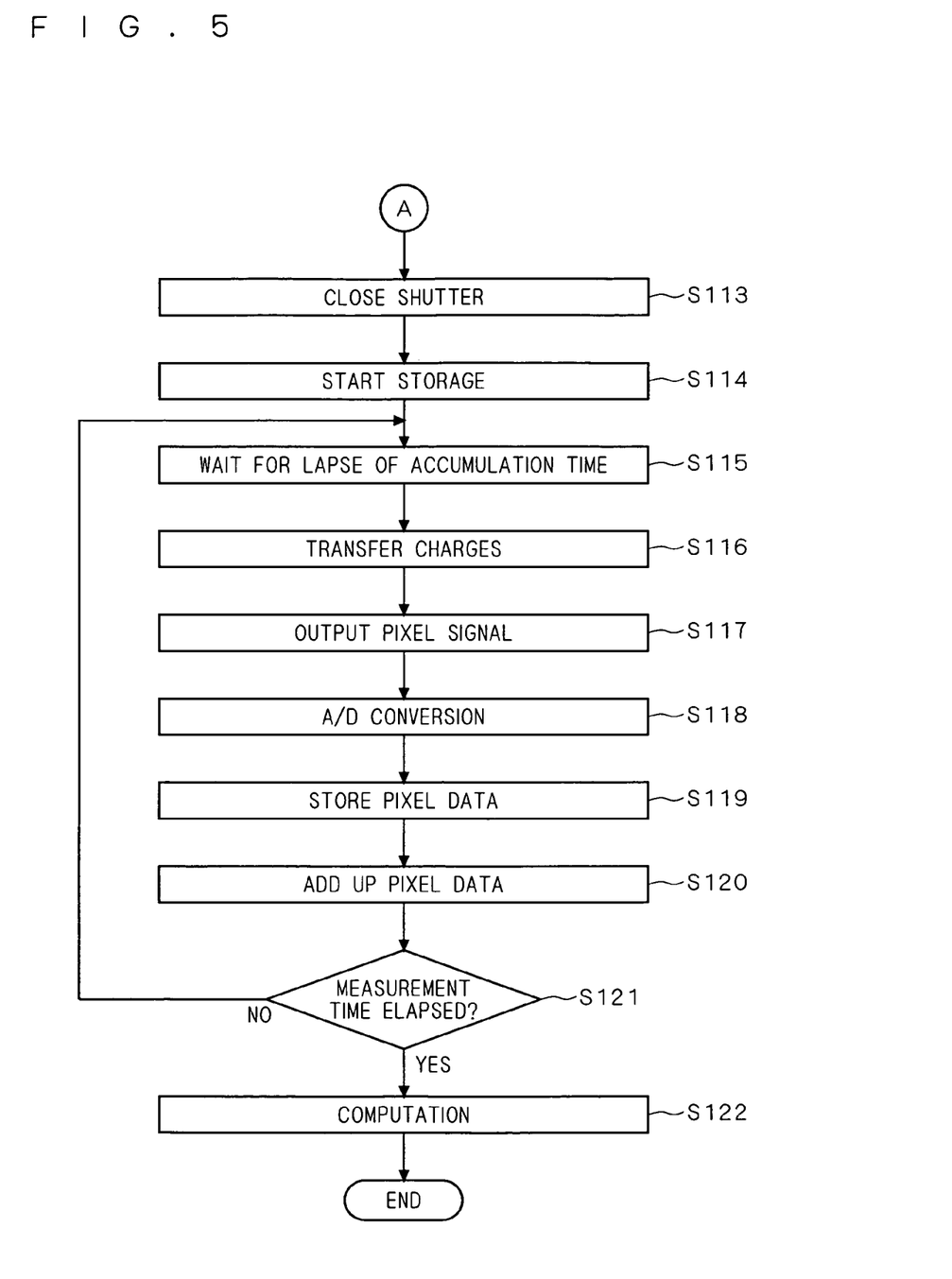
FIG. 5 is a flowchart showing operations of the spectral radiance meter.

FIGS. 4 and 5 are flowcharts showing operations of the spectral radiance meter 1 realized by the control of the control unit 122.

At the time of measuring the spectral radiance, first, as shown in FIG. 4, the control unit 122 controls the sensor 110 and the A/D converter 112 and pre-measures the quantity of the light 604 to be measured (step S101). In a state where the neutral density filter 104 is inserted in the path of the light 604 to be measured, the quantity of the light 604 to be measured can be calculated from the pixel data obtained by the control unit 122 and the transmittance of the neutral density filter 104. In a state where the neutral density filter 104 is removed from the path of the light 604 to be measured, the quantity of the light 604 to be measured can be calculated from the pixel data obtained by the control unit 122. Since high precision of the pre-measurement is not necessary, it is allowed to perform the pre-measurement in time shorter than main measurement. It is not necessary to perform the pre-measurement by using the sensor 110. A sensor for pre-measurement may be performed separately from the sensor 110 and the pre-measurement may be performed by using the sensor for pre-measurement.

Subsequently, the control unit 122 determines the length of the storage periods SP(1), SP(2), . . . , and SP(M) (hereinbelow, called "storage time") (step S102). The control unit 122 determines storage time in which the photodiode 128 is not saturated based on the quantity of the light 604 to be measured, which is pre-measured in step S101. As a result, saturation in the photodiode 128 is suppressed irrespective of the measurement time and the quantity of the light 604 to be measured, and the quantity of the light 604 to be measured can be properly measured.

Preferably, the control unit 122 determines the storage time so that the measurement time becomes the integral multiple of the fluctuation cycle of the quantity of the light 604 to be measured based on the fluctuation cycle of the quantity of the light 604 to be measured which is accepted by the operation unit 118 within the range in which the photodiode 128 is not saturated. It is also preferable that the control unit 122 detects the fluctuation cycle of the quantity of the light 604 to be measured from the signal obtained by the sync signal input terminal 120, and determines storage time so that the measurement time becomes the integral multiple of the fluctuation cycle of the quantity of the light 604 to be measured based on the detected fluctuation cycle within the range in which the photodiode 128 is not saturated. When the storage period is determined based on the fluctuation cycle of the quantity of the light 604 to be measured, the measurement precision of the quantity of the light 604 to be measured can be improved.

The storage time may be the same in all of the storage periods SP(1), SP(2), . . . , and SP(M) or may be different in each of the storage periods SP(1), SP(2), . . . , and SP(M).

Subsequently, the control unit 122 inserts or removes the neutral density filter 104 based on the quantity of the pre-measured light 604 to be measured (step S103). Specifically, when the quantity of the light 604 to be measured which is pre-measured in the state where the neutral density filter 104 is inserted in the path of the light 604 to be measured is equal to or less than a threshold TH1, the neutral density filter 104 is removed from the path of the light 604 to be measured. When the quantity of the light 604 to be measured which is pre-measured in the state where the neutral density filter 104 is removed from the path of the light 604 to be measured is larger than a threshold TH2, the neutral density filter 104 is inserted in the path of the light 604 to be measured. As described above, the quantity of the light 604 to be measured which reaches the photodiodes 128 is adjusted based on the pre-measured quantity of the light 604 to be measured. In a case where the quantity of the light 604 to be measured is large, the light 604 to be measured is reduced and the resultant light is led to the sensor 110. In a case where the quantity of the light 604 to be measured is small, the light 604 to be measured is led to the sensor 110 without being reduced. In such a manner, the range of the light quantity which can be measured in the main measurement can be widened.

The threshold TH1 for removal of the neutral density filter 104 and the threshold TH2 for insertion of the neutral density filter 104 may be the same. By setting the threshold TH1 for removal of the neutral density filter 104 and the threshold TH2 for insertion of the neutral density filter 104 to be different from each other and performing hysteresis control, the measurement result can be prevented from being varied due to frequent insertion/removal of the neutral density filter 104.

After completion of the pre-measurement, the spectral radiance meter 1 starts the main measurement and performs sampling measurement in steps S104 to S112 and then dark measurement in steps S113 to S121.

In the sampling measurement, first, as shown in FIG. 4, the control unit 122 controls the shutter 106 to open the shutter 106 (step S104) and controls the sensor 110 to start storage of charges to the photodiode 128 (step S105).

Subsequently, the control unit 122 waits until the storage time elapses (step S106). After lapse of the storage time, the control unit 122 controls the sensor 110 to transfer charges generated and stored in the CCD 130 by the photodiodes 128 to the FD amplifier 132 (step S107), and makes the FD amplifier 132 output the pixel signal (step S108).

Subsequently, the control unit 122 makes the A/D converter 112 convert the analog pixel signal to digital pixel data (step S109), and stores the obtained pixel data into the memory 138 (step S110).

The control unit 122 adds up the pixel data stored in the memory 138 in accordance with the equation 1 (step S111). When the measurement time elapses ("YES" in step S112), the control unit 122 finishes the sampling measurement and starts the dark measurement. When the measurement period has not elapsed ("NO" in step S112), the control unit 122 returns to step S106 and waits until the next storage period elapses.

Also during the charge transfer (step S107), pixel signal output (S108), A/D conversion (S109), and pixel data storage (S110), the photodiodes 128 continue generation and storage of charges without interruption. Therefore, during the measurement period MP, the photodiodes 128 continue the photoelectric conversion of the light 604 to be measured and generation of the charges according to the quantity of the received light 604 to be measured, and store the charges generated in each of the storage periods SP(1), SP(2), ... and SP(M). The A/D converter 112 converts the quantities Q(1, i), Q(2, i), ..., and Q(M, i) of charges stored in the photodiodes 128 during the storage periods SP(1), SP(2), ..., and SP(M) to the pixel data D(1, i), D(2, i), ..., and D(M, i). Further, the control unit 122 adds up the plurality of pieces of pixel data D(1, i), D(2, i), ... and D(M, i) converted by the A/D converter 122, thereby computing the pixel data D(i) in the entire measurement period MP.

In the dark measurement, first, as shown in FIG. 5, the control unit 122 controls the shutter 106 to close the shutter 106 (step S113), and controls the sensor 110 to start storage of charges in the photodiodes 128 (step S114).

Subsequently, like S106 to S111 of the sampling measurement, wait for a lapse of storage time (step S115), charge transfer (step S116), pixel signal output (step S117), A/D conversion (step S118), pixel data storage (step S119), and pixel data integration (S120) are performed. When the measurement time elapses ("YES" in step S121), the control unit 122 finishes the dark measurement. When the measurement time has not elapsed ("NO" in step S121), the control unit 122 returns to step S115 and waits until the next storage period elapses.

After the dark measurement is finished, the control unit 122 subtracts, in order to eliminate a black current noise, the pixel data D(i) obtained by the dark measurement from the pixel data D(i) obtained by the sampling measurement, and computes spectral radiance from the computation result.

By measuring the spectral radiance as described above, the light 604 to be measured whose quantity periodically fluctuates can be properly measured in short time without causing saturation of the photodiodes 128. There is also an advantage such that the spectral radiance meter 1 does not have to use, in order to prevent saturation of charges, the neutral density filter 104 having extremely low transmittance whose precision is not easily assured.

It is also possible to preliminarily determine division number M of the measurement period MP and set M times of the storage time determined in step S102 as measurement time, or determine the division number M of the measurement period MP based on the storage time determined in step S102 and the measurement time accepted by the operation unit 118. In such a manner, the measurement time can be made constant regardless of the storage time. In a case where the quantity of the light 604 to be measured is large and the effects of flicker are expected, the division number M is large. In a case where the quantity of the light 604 to be measured is small and the effects of flicker are not so expected, the division number M is small. Consequently, measurement adapted to the quantity of the light 604 to be measured can be performed.

1-3 Actual Example of Measurement Result

Figure 6:
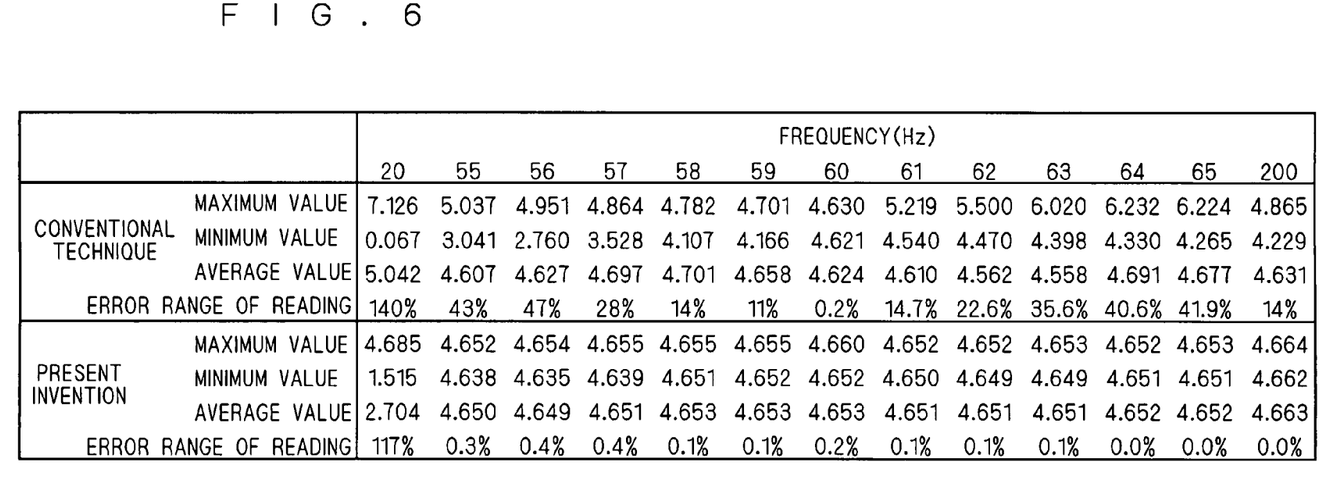
FIG. 6 is a diagram showing an actual example of a measurement result.

FIG. 6 is a diagram showing an actual example of measurement results of a conventional spectral radiance meter and the spectral radiance meter 1 as the first embodiment of the present invention. FIG. 6 shows, with respect to light to be measured whose light quantity fluctuation frequency is 20 to 200 Hz, maximum values, minimum values, and average values of brightness, and error ranges of reading in a case where brightness is measured by a conventional spectral radiance meter and the spectral radiance meter 1 as the first embodiment of the present invention. The measurement time is set as 1/60 second.

As obvious from the measurement results of FIG. 6, the spectral radiance meter 1 as the first embodiment can obtain excellent repetitive precision in the range of frequencies wider than that of the conventional spectral radiance meter.

2 Second Embodiment

Figure 7:
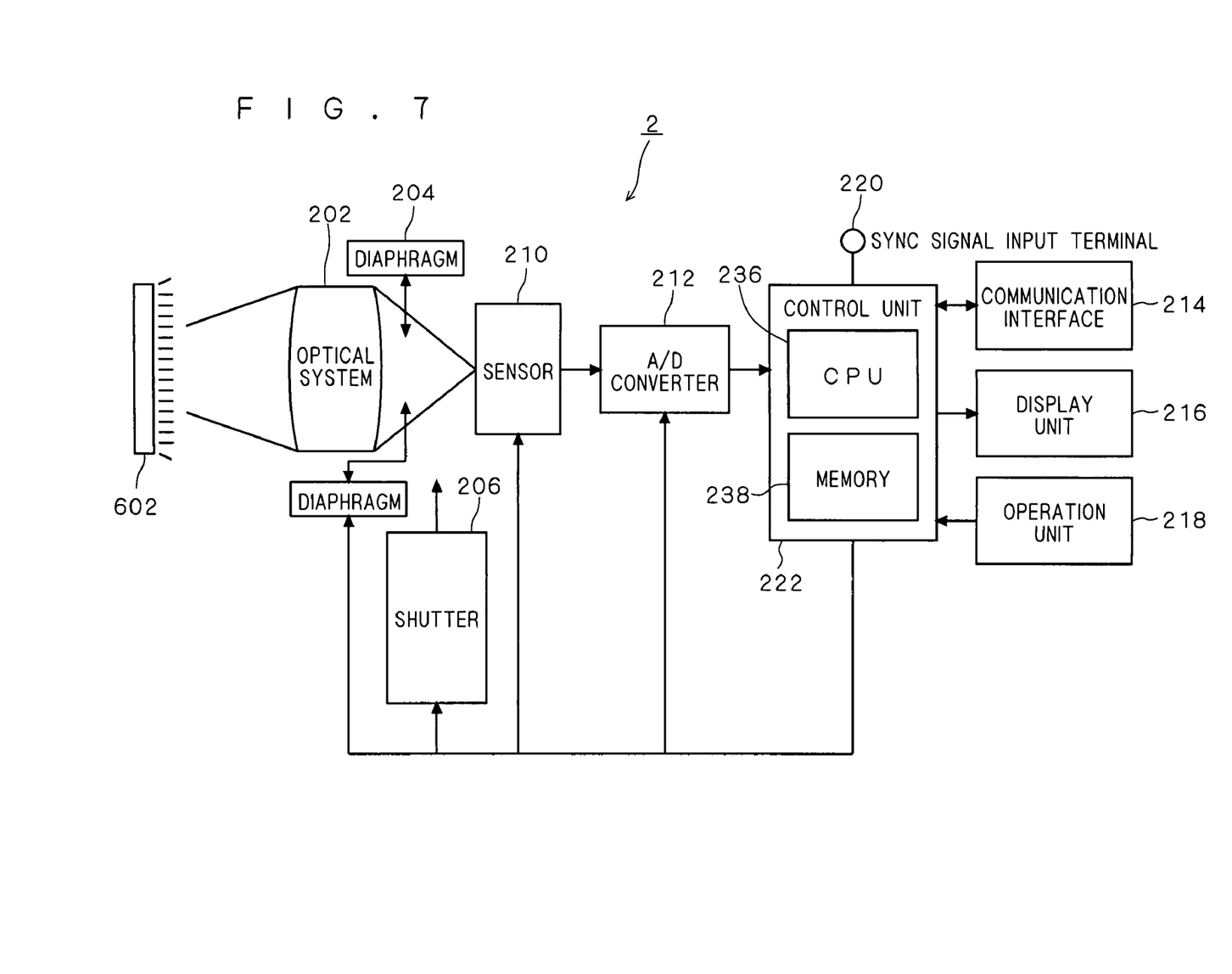
FIG. 7 is a schematic diagram of a luminance meter as a second embodiment.

FIG. 7 is a schematic diagram of a brightness meter 2 as a second embodiment of the present invention. The brightness meter 2 mainly measures brightness of the light 604 to be measured, which is light generated by the display 602 such as a CRT display, a plasma display, or a liquid crystal display.

As shown in FIG. 7, the brightness meter 2 has an optical system 202, a diaphragm 204, a shutter 206, a sensor 210, an A/D converter 212, a communication interface 214, a display unit 216, an operation unit 218, a sync signal input terminal 220, and a control unit 222.

The optical system 202 guides the light 604 to be measured which is incident on the brightness meter 2 to the sensor 210. The optical system 202 can be constructed by combining a lens and a mirror.

The diaphragm 204 regulates a flux of transmission light. The diaphragm 204 is opened/closed under control of the control unit 222. In a case where the diaphragm 204 is closed, a flux of light incident on the brightness meter 2 is regulated by the diaphragm 204 and the resultant light reaches the sensor 210. On the other hand, in a case where the diaphragm 204 is opened, the flux of light 604 to be measured incident on the brightness meter 2 reaches the sensor 210 without being regulated. Therefore, the diaphragm 204 functions as adjusting means for adjusting the quantity of the light 604 to be measured which reaches the sensor 210.

The shutter 206 interrupts light. The shutter 206 is inserted or removed to/from the optical path of the light 604 to be measured under control of the control unit 222. In a case where the shutter 206 is inserted in the optical path of the light 604 to be measured, the light 604 to be measured which is incident on the brightness meter 2 does not reach the sensor 210. On the other hand, in a case where the shutter 206 is removed from the optical path of the light 604 to be measured, the light 604 to be measured which is incident on the brightness meter 2 reaches the sensor 210.

The sensor 210 receives the light 604 to be measured and outputs a signal indicative of the quantity of the light 604 to be measured.

Figure 8:
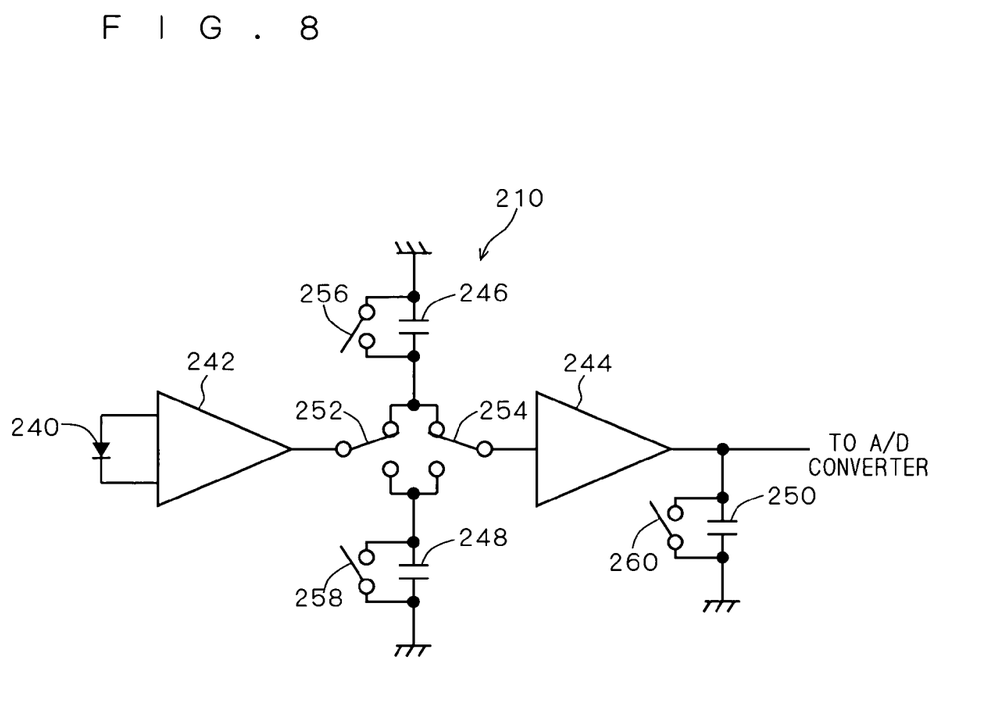
FIG. 8 is a circuit diagram of a sensor.

FIG. 8 is a circuit diagram of the sensor 210. As shown in FIG. 8, the sensor 210 has a photodiode 240, a differential amplifier 242, a noninverting amplifier 244, capacitors 246, 248, and 250, change-over switches 252 and 254, and discharge switches 256, 258, and 260.

The photodiode 240 is connected to inputs of the differential amplifier 242, and the capacitors 246 and 248 are connected to the output of the differential amplifier 242 via the change-over switch 252. The differential amplifier 242 amplifies a signal output from the photodiode 240 and outputs the amplified signal. The changeover switch 252 switches connection of the output of the differential amplifier 242 between the capacitors 246 and 248 under control of the control unit 222. More concretely, the changeover switch 252 connects the output of the differential amplifier 242 to the capacitor 246 in odd-numbered storage periods SP(1), SP(3), . . . , and connects the output of the differential amplifier 242 to the capacitor 248 in even-numbered storage periods SP(2), SP(4), . . . . Consequently, a signal output from the photodiode 240 is amplified by the differential amplifier 242. In the odd-numbered storage periods SP(1), SP(3), . . . , the amplified signal is applied to the capacitor 246. In the even-numbered storage periods SP(2), SP(4), . . . , the amplified signal is applied to the capacitor 248. As a result, in the odd-numbered storage periods SP(1), SP(3), . . . charges according to the quantity of light received by the photodiode 240 are stored in the capacitor 246. In the even-numbered storage periods SP(2), SP(4), . . . , charges according to the quantity of the light received by the photodiode 240 are stored in the capacitor 248.

The capacitors 246 and 248 are connected to the input of the noninverting amplifier 244 via the change-over switch 254, and an output of the noninverting amplifier 244 is connected to the capacitor 250. The voltage amplification factor of the noninverting amplifier 244 is 1, and the input impedance of the noninverting amplifier 244 is sufficiently high. The change-over switch 254 switches connection of the input of the noninverting amplifier 244 between the capacitors 246 and 248 under control of the control unit 222. More concretely, the changeover switch 254 connects the input of the noninverting amplifier 244 to the capacitor 246 after the odd-numbered storage periods SP(1), SP(3), . . . , and connects the input of the noninverting amplifier 244 to the capacitor 248 after the even-numbered storage periods SP(2), SP(4), . . . . Consequently, after the odd-numbered storage periods SP(1), SP(3), . . . , the same voltage as that across the capacitor 246 is applied to the capacitor 250. After the even-numbered storage periods SP(2), SP(4), . . . , the same voltage as that across the capacitor 248 is applied to the capacitor 250. As a result, after the odd-numbered storage periods SP(1), SP(3), . . . , charges stored in the capacitor 250 become the same quantity as that stored in the capacitor 246. After the even-numbered storage periods SP(2), SP(4), . . . , charges stored in the capacitor 250 become the same quantity as that stored in the capacitor 248. That is, a result apparently equivalent to that in a case where the charges stored in the capacitor 246 or 248 are transferred to the capacitor 250 is obtained.

The voltage across the capacitor 250 is output to the A/D converter 212 as an output of the sensor 210.

To the capacitors 246, 248, and 250, the discharge switches 256, 258, and 260 are connected in parallel. The discharge switches 256, 258, and 260 are opened/closed under control of the controller and discharge the charges stored in the capacitors 246, 248, and 250, respectively. Concretely, the discharge switches 256 and 258 discharge the charges stored in the capacitors 246 and 248 respectively after the charge stored in the capacitors 246 and 248 is transferred to the capacitor 250. The discharge switch 260 discharges the charges stored in the capacitor 250 after a voltage generated by the storage of charges is outputted to the capacitor 250 as an output of the sensor 210.

As described above, while switching the storing means for storing the charges generated in the odd-numbered storage periods SP(1), SP(3), . . . and the even-numbered storage periods SP(2), SP(4), . . . between the capacitors 246 and 248, the charges stored in the capacitor 246 or 248 are transferred to the another capacitor 250 and discharged until the next storage period. As a result, while continuously storing the charges, the charges stored in the measurement period MP can be transferred and A/D converted.

Referring again to FIG. 7, the A/D converter 212 converts an analog signal output from the sensor 210 to digital data and outputs the digital data to the control unit 222. Consequently, the A/D converter 212 can convert the amount of charges stored in the capacitor 250 to a digital value and output the digital value.

The communication interface 214 connects the brightness meter 2 and an external device such as an external computer so that they can communicate with each other.

The display unit 216 displays a measurement result of the brightness meter 2.

The operation unit 218 accepts an operation of the operator such as input of the fluctuation cycle of the quantity of light to be measured and measurement time.

The sync signal input terminal 220 obtains a signal which fluctuates synchronously with fluctuations in the quantity of the light 604 to be measured like a vertical sync signal in a case of measuring light generated by a CRT display.

The control unit 222 is a built-in computer having at least a CPU 236 and a memory 238 and makes the CPU 236 execute a control program loaded to the memory 238, thereby controlling the diaphragm 204, the shutter 206, the sensor 210, the A/D converter 212, the communication interface 214, the display unit 216, the operation unit 218, and the other parts of the brightness meter 2. The control unit 222 makes the CPU 236 execute the control program loaded to the memory 238, thereby computing brightness from digital data obtained from the A/D converter 212.

During the measurement period in which the photodiode 240 photoelectrically converts the light 604 to be measured, the control unit 222 makes the sensor 210 transfer the charges stored in the capacitors 246 and 248 from the capacitors 246 and 248 to the capacitor 250, output an analog signal having a voltage according to the quantity of charges transferred, and makes the A/D converter 212 convert the analog signal output from the sensor 210 to digital data.

By the operations, the charges generated by the photodiode 240 and stored in the capacitors 246 and 248 during the measurement period are read in a plurality of times. The control unit 222 obtains digital data d(1), d(2), . . . , and d(M) according to quantity q(1), q(2), . . . , and q(M) of charges generated and stored by the photodiode 240 and stored in the capacitors 246 and 248 in a plurality of storage periods SP(1), SP(2), . . . , SP(M) obtained by dividing a measurement period MP as shown in FIG. 3. The digital data d(j) is obtained by converting an analog signal a(j) having a voltage according to the quantity q(j) of charges generated by the photodiode 240 and stored in the capacitors 246 and 248 in the storage period SP(j) (j=1, 2, . . . , M) to a digital value.

Further, the control unit 222 adds up the plurality of pieces of pixel data d(1), d(2), . . . , and d(M) in accordance with Equation 2, and calculates digital data "d" according to the quantities q(1), q(2), . . . , and q(N) generated and stored by the sensor 210 in the measurement period MP.

$$d = \sum_{j=1}^{M} d(j) \qquad \text{Equation (2)}$$

By making the brightness meter 2 as described above operate in a manner similar to the spectral radiance meter 1 as the first embodiment, the light 604 to be measured whose quantity fluctuates periodically can be properly measured in short time without causing saturation of the photodiode 240.

3 Others

The case of applying the present invention to the spectral radiance meter 1 for measuring spectral radiance of the light 604 to be measured has been described in the first embodiment, and the case of applying the present invention to the brightness meter 2 for measuring brightness of the light 604 to be measured has been described in the second embodiment. However, the application range of the present invention is not limited to the embodiments. The present invention can be generally applied to light quantity measuring apparatuses for measuring the quantity of the light 604 to be measured such as an illuminance meter, a spectral colorimeter, and the like.

While the invention has been shown and described in detail, the foregoing description is in all aspects illustrative and not restrictive. It is therefore understood that numerous modifications and variations can be devised without departing from the scope of the invention. In particular, it is naturally expected to combine the technique described in the first embodiment and the technique described in the second embodiment.

What is claimed is:

1. A light quantity measuring apparatus for measuring a quantity of light to be measured, comprising:
a sensor that receives a quantity of light and generates charges according to the quantity of light received by the sensor;
a storage that receives charges generated by the sensor and stores the charges generated by the sensor;
an A/D converter that converts a quantity of the charges stored in the storage to a digital value; and
a controller that adds up a plurality of digital values, wherein the controller also controls the light quantity measuring apparatus, wherein, under control of the controller, the sensor continuously generates charges according to the quantity of the received light to be measured during a measurement period without interruption, the storage stores the charges generated by the sensor in each of a plurality of storage periods obtained by dividing the measurement period without interruption, the A/D converter converts the quantity of charges stored in the storage in each of the plurality of storage periods to a digital value during receipt by the storage of the generated charges by the sensor, and the integrator adds up a plurality of digital values obtained by conversion of the A/D converter.

2. The light quantity measuring apparatus according to claim 1, further comprising an adjuster that adjusts the quantity of light to be measured which reaches the charge generator based on the quantity of light to be measured which is pre-measured prior to start of the measurement period.

3. The light quantity measuring apparatus according to claim 1, wherein the controller determines length of a storage period based on the quantity of light to be measured which is pre-measured prior to start of the measurement period.

4. The light quantity measuring apparatus according to claim 1, wherein the controller determines length of a storage period based on a fluctuation cycle of the quantity of light to be measured.

5. The light quantity measuring apparatus according to claim 4, further comprising a first operation-acceptor that accepts an entry of the fluctuation cycle of the quantity of light to be measured, wherein the controller determines length of the storage period based on the fluctuation cycle accepted as an entry by the first operation-acceptor.

6. The light quantity measuring apparatus according to claim 4, further comprising an obtaining unit that obtains a signal which fluctuates synchronously with fluctuations in the quantity of light to be measured, wherein the controller detects the fluctuation cycle of the quantity of light to be measured from the signal obtained by the obtaining unit, and determines length of the storage period based on the detected fluctuation cycle.

7. The light quantity measuring apparatus according to claim 1, further comprising a second operation-acceptor that accepts, as an entry, length of the measurement period, wherein the controller determines division number of the measurement period based on the length of the storage period and the length of the measurement time received, as an entry, by the second operation-acceptor.

8. The light quantity measuring apparatus according to claim 1, wherein the storage is a capacitor.

9. The light quantity measuring apparatus according to claim 1, wherein the storage is an amplifier.

* * * * *